(12) United States Patent
Jain et al.

(10) Patent No.: US 12,130,862 B2
(45) Date of Patent: *Oct. 29, 2024

(54) AUTOMATED INDICATION AND MAPPING OF OBJECTS IN VIDEO CONTENT

(71) Applicant: Amazon Technologies, Inc., Seattle, WA (US)

(72) Inventors: Jatin Jain, Redmond, WA (US); Hooman Mahyar, Kirkland, WA (US); Abhinav Misra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,835

(22) Filed: Sep. 26, 2023

(65) Prior Publication Data

US 2024/0045905 A1 Feb. 8, 2024

Related U.S. Application Data

(63) Continuation of application No. 17/861,057, filed on Jul. 8, 2022, now Pat. No. 11,816,153, which is a
(Continued)

(51) Int. Cl.
*G06F 16/783* (2019.01)
*G06F 16/738* (2019.01)
(Continued)

(52) U.S. Cl.
CPC .......... *G06F 16/784* (2019.01); *G06F 16/738* (2019.01); *G06F 16/7867* (2019.01);
(Continued)

(58) Field of Classification Search
None
See application file for complete search history.

(56) References Cited

U.S. PATENT DOCUMENTS 10,096,319 B1 10/2018 Jin et al.
2006/0245617 A1 11/2006 Shan et al.
(Continued)

FOREIGN PATENT DOCUMENTS

WO 2018092401 A1 5/2018

OTHER PUBLICATIONS

TheTake1, Davey, Alba, "This app identifies the movie you're watching and lets you buy what you see.", Wired, Dec. 4, 2014.
(Continued)

*Primary Examiner* — James R Marandi
(74) *Attorney, Agent, or Firm* — Eversheds Sutherland (US) LLP

(57) ABSTRACT

Systems, methods, and computer-readable media are disclosed for systems and methods for automated identification and mapping of objects in video content. Example methods may include determining a first set of frames in video content, determining, using one or more object recognition algorithms, a first object present in the first set of frames, determining that a first product corresponding to the first object is present in a product catalog comprising a set of product images, associating a first product identifier of the first product with a video identifier of the video content, and causing presentation of a set of product identifiers associated with the video identifier.

20 Claims, 8 Drawing Sheets

Related U.S. Application Data continuation of application No. 16/707,299, filed on Dec. 9, 2019, now Pat. No. 11,461,393.

(51) Int. Cl.
*G06F 16/78* (2019.01)
*G06N 3/02* (2006.01)
*G06Q 30/0601* (2023.01)
*G06V 20/40* (2022.01)
*G06V 40/16* (2022.01)
*H04N 21/478* (2011.01)
*H04N 21/84* (2011.01)
*H04N 21/858* (2011.01)

(52) U.S. Cl.
CPC ........... *G06N 3/02* (2013.01); *G06Q 30/0601* (2013.01); *G06V 20/40* (2022.01); *H04N 21/84* (2013.01); *H04N 21/858* (2013.01); *G06V 40/172* (2022.01); *H04N 21/47815* (2013.01)

(56) References Cited

U.S. PATENT DOCUMENTS

| | | |
|---|---|---|
| 2009/0327894 A1 | 12/2009 | Rakib et al. |
| 2013/0218721 A1 | 8/2013 | Borhan et al. |
| 2015/0235290 A1 | 8/2015 | Boemi et al. |
| 2016/0132720 A1 | 5/2016 | Klare et al. |
| 2017/0372165 A1 | 12/2017 | Jouhikainen et al. |
| 2019/0258671 A1 | 8/2019 | Bou et al. |
| 2019/0318405 A1 | 10/2019 | Hu et al. |
| 2020/0134320 A1 | 4/2020 | Crossley et al. |
| 2020/0336802 A1 | 10/2020 | Russell et al. |

OTHER PUBLICATIONS

TheTake2, Shieber, Jonathan, "Working with major stdios, The Take launces AI image recognition engine for business", TechCrunch, dated Feb. 13, 2017.

TheTake3, Alarcon, Nefi, "Inception Spotlight: Startup uses AI to identify products in videos", Nvidia Developer, dated, Apr. 12, 2019.

TheTake4, web.archive.org/web/20191120014128/https://thetake.ai/, dated Nov. 20, 2019.

US 12,130,862 B2

AUTOMATED INDICATION AND MAPPING OF OBJECTS IN VIDEO CONTENT

CROSS-REFERENCE TO RELATED APPLICATION(S)

This application is a continuation of U.S. application Ser. No. 17/861,057, filed Jul. 8, 2022, which is a continuation of U.S. application Ser. No. 16/707,299 filed Dec. 9, 2019, the disclosures of which are hereby incorporated by reference.

BACKGROUND

Certain digital content, such as movies, television shows, and other video content may be available via streaming. For example, users may stream movies, television series, and so forth using streaming devices, such as smartphones, televisions, etc. Users may have inquiries about objects and/or people that may appear in certain video content. Determining what video content, and more specifically, what segment of video content, a query is directed towards may be difficult. In addition, additional functionality during consumption of video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
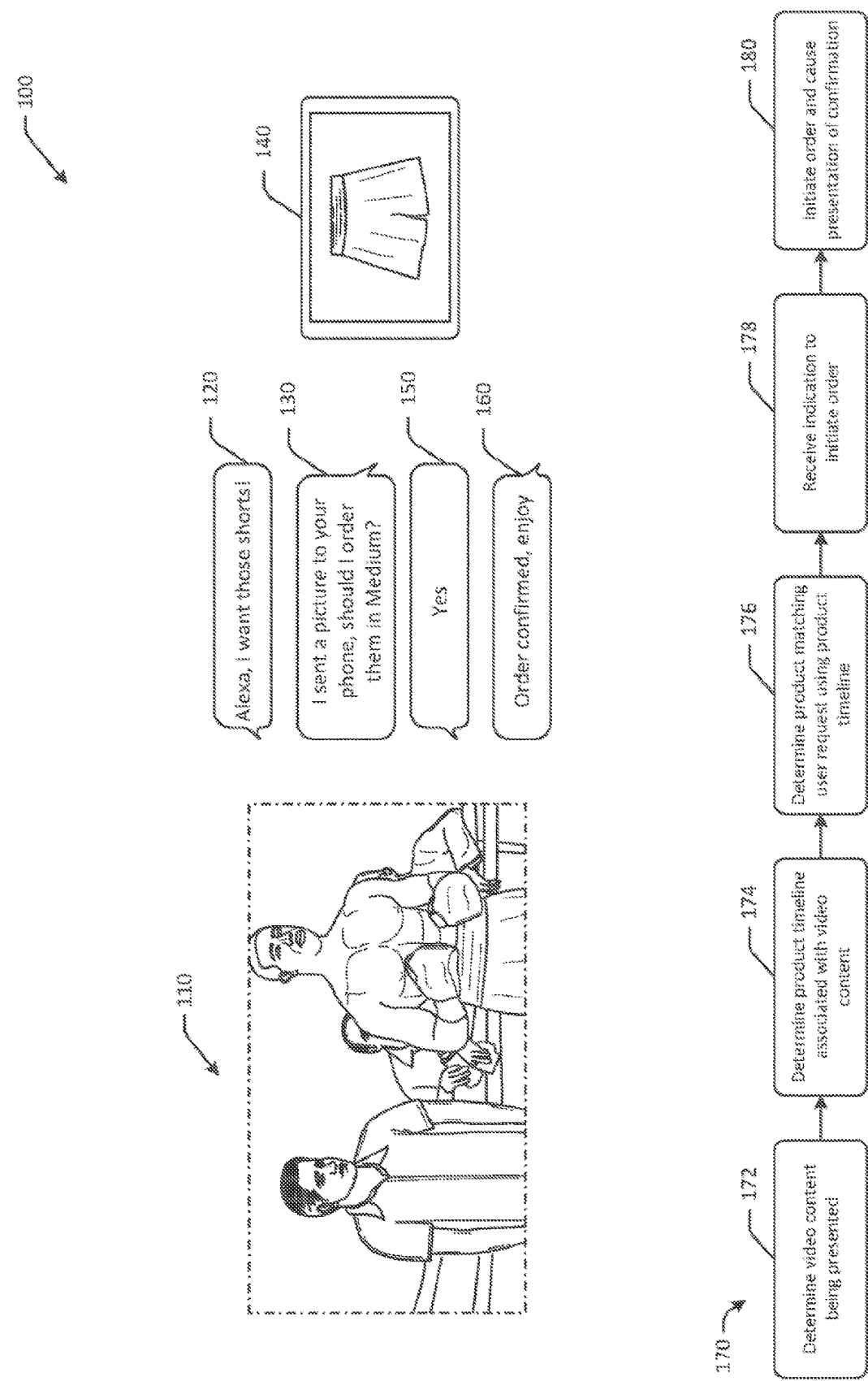
FIG. 1 is a schematic illustration of an example use case for automated identification and mapping of objects in video content in accordance with one or more example embodiments of the disclosure.

Digital content may include video content, such as movies, television shows, streaming shows (e.g., made for Amazon Prime, Netflix, etc.), and other video content. Users may consume such video content using various devices. While consuming video content, users may see an object or item that appears in the video content, and may be interested in additional information. For example, a user may see a car, clothing, accessories, or other objects of interest to the user that appear in the video content. In addition, the user may see the object in association with a particular actor, location, event, scene, or other aspect of the video content. For example, the user may see that a particular actor is wearing clothing for which the user desires additional information. In another example, the user may see that a car appears during a certain scene of the video content. The user may therefore see an object of interest in video content and may desire additional information.

To request additional information, in one example, the user may make a request via voice, such as by speaking a voice command or voice request to a voice assistant device. In other embodiments, the user may input a query, such as a search query, via a text-based input, such as by using a phone, tablet, computer, or other device. The user may or may not request additional information while consuming the video content. In some embodiments, use of voice-based input to make the request for additional information may provide an improved user experience, as the user can continue to consume the video content while interacting with a voice assistant instead of shifting visual focus from the content.

In one example, a user may see an object or item that appears during playback or consumption of video content, and may desire to purchase the object. For example, the user may be watching a movie in which a pair of sunglasses appears that the user desires to purchase. In such instances, the user may desire to purchase the pair of sunglasses without knowing a manufacturer, a model, or other information that may otherwise be helpful in identifying and/or purchasing the object.

Embodiments of the disclosure include systems and methods to automatically identify objects that appear in video content, such that accurate responses to queries related to objects that appear in the video content may be generated. Certain embodiments generate mappings of objects to the video content, and in some instances, mapping of relationships between objects and the actors and/or characters with which the object is associated (e.g., sunglasses that Actor 1 wears, car than Actor 2 drives, etc.). Some embodiments may generate a timeline for the video content that reflects when in the content certain objects and/or actors appear, which may be used to increase accuracy of requests made by users during consumption of particular video content. For example, while watching video content, a user may speak "what shoes is Character 1 wearing right now?" and a response may be determined using a product appearance timeline.

In some embodiments, to determine objects and/or actors that appear or are otherwise present in video content, the video content may be separated into frames and analyzed using one or more video/image processing algorithms, optional text processing algorithms, and/or optional audio processing algorithms. The video processing algorithms may include one or more object detection algorithms to determine objects that appear in one or more frames, one or more facial recognition algorithms to determine actors that appear in one or more frames, one or more event detection algorithms to determine events and/or relationships between objects and actors that appear in one or more frames, and/or other algorithms.

This disclosure relates to, among other things, devices, systems, methods, computer-readable media, techniques, and methodologies for automated identification and mapping of objects in video content and presentation. Certain embodiments may automatically identify and map objects that appear in video content, actors that appear in video content, relationships between objects and actors, and may determine whether products corresponding to identified objects are present in a product catalog that may include products for sale. Certain embodiments may generate a timeline of products in the product catalog that correspond to identified objects, along with data related to the time at which the products appear in the video content. Some embodiments may be configured to determine and/or initiate orders of products based at least in part on a user request. In some instances, machine learning (e.g., deep neural networks, long short term memory units and/or recurrent neural networks, etc.) may be used to identify various objects in video content that may appear at different angles or views.

Referring to FIG. 1, an example use case 100 for automated identification and mapping of objects in video content is depicted in accordance with one or more example embodiments of the disclosure. For example, at a first instance, a user may be consuming video content 110. The video content 110 may be a scene of a movie or other content corresponding to a boxing event. In the scene, one of the actors may be wearing a pair of shorts for a boxing match. The user may like the shorts, and may desire more information and/or to purchase the shorts. The user may therefore input a query regarding the shorts in voice or text form.

For example, in FIG. 1, the user may speak a first utterance 120 of "Alexa, I want those shorts." The user may speak the first utterance 120 to the same device used to consume the video content 110 or to a different device, such as a voice-based speaker device. The user may not necessarily provide context of the request, such as the name of the actor or character wearing the shorts, the title of the video content, and/or other information.

Embodiments of the disclosure may automatically determine contextual information for the user request included in the first utterance 120. For example, one or more computer systems, such as a remote server, may determine a user account identifier associated with the device at which the first utterance 120 was received. The remote server may determine whether video content is being presented at the device, or at any other devices associated with the user account identifier. If so, the remote server may determine a timestamp representing a point in the video content at which the user made the request, such as one hour eight minutes into a movie, etc. The remote server may determine a set of product identifiers that appear in the video content during a scene corresponding to the timestamp. The remote server may determine whether a product that matches the user request, which may be "shorts" in the example of FIG. 1, is present in the set of product identifiers. If so, the remote server may determine that the user is interested in the shorts or other requested product that is present in the set of product identifiers.

At a first audible response 130, the device may audibly present "I sent a picture to your phone, should I order them in medium?" For example, the remote server may determine that the user desires to place an order for the shorts that are identified as appearing in the video content (which may or may not be at a certain time in the video content). The remote server may cause the device to present the first audible response 130 while playback of the content is paused or continues. The remote server may, in some embodiments, send information related to the shorts or other product to another device associated with the user account identifier, such as a phone or tablet. In the example of FIG. 1, the remote server may cause information, such as an image, pricing, and so forth, of the shorts to a phone associated with the user account identifier. The remote server may determine a desired size based at least in part on historical purchases associated with the user account identifier. As illustrated in FIG. 1, an image of the shorts and/or other information may be presented at a tablet 140 or other device for the user to view if desired.

At a second utterance 150, the user may respond affirmatively, indicating that an online order is to be initiated. In some embodiments, a wakeword may be used before an initial interaction with a voice assistant device, such as "Alexa," and may not be needed for follow up voice input.

At a second audible response 160, the remote server may determine the affirmative response and may initiate an order of the product for the user account identifier. The remote server may cause the device to present the second audible response 160 of "order confirmed, enjoy." A shipment of the shorts may then be delivered to an address associated with the user account identifier.

Accordingly, embodiments of the disclosure may be used to provide information about products or objects that appear in video content, and may allow for orders of products to be placed while watching content or not while watching content (e.g., a user may simply speak "I want the sunglasses that Actor 1 wore in Movie 2, etc.).

To determine objects that appear in video content that may be available in a product catalog or other depository of products for sale, embodiments may use one or more of object detection and/or object recognition that may include computer vision and image processing that is configured to detect instances of semantic objects of a certain class (such as humans, buildings, or cars) in digital images and videos. To determine relationships between objects and actors, embodiments may use face detection and/or facial recognition algorithms. Face detection may be used to detect human faces in digital images (e.g., by drawing a box around the detected face, etc.). Facial recognition may be used to identify a person from a digital image or a video frame from a video source. To determine whether an object identified in video content corresponds to an object in a product catalog, embodiments may use image matching algorithm(s) configured to match images of the identified objects with the catalog images.

In some embodiments, one or more computer system services may be used to locate products corresponding to identified images. For example, a service may be used to relate to the scene/frame for which the user issued a buy command. Some embodiments may enrich metadata of a product catalog by associating, with respective products, any instances of actors and/or video content in which the products appear. Metadata may include information about an item with the videos it was in, actors that have used it, the situations it was present, etc. In some instances, after video content is processed to produce a product appearance timeline of products present at different timestamps of the movie, information related to the movie, place, the actor associated with the product, and so forth can be captured and submitted as additional search context to enable users to search for products based on the movie or video content information. For example, a user may be able to search for "the watch worn by TC in Top Gun."

To automatically identify and map objects in video content, an example process flow 170 is presented and may be performed, for example, by one or more content scanning engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 170 of FIG. 1.

At a first block 172, video content being presented may be determined. For example, in instances where a request or query is made while content is being presented at a device associated with a user, the remote server may determine the video content that is being presented. If there is no video content being presented, the remote server may determine a title or identifier of content that may be included in a user request.

At a second block 174, a product timeline associated with the video content may be determined. For example, the remote server may determine that a device associated with the user account identifier is being used to playback content, and may determine a product appearance timeline associated with the video content. In some embodiments, an active user profile may be determined. For example, an active user profile may be determined using an account identifier for an account associated with a device and/or that is logged in at the device or in an active session, a profile that is selected from a set of profiles associated with a user account, and/or another identifier.

At a third block 176, a product matching the user request may be determined using the product timeline. For example, depending on the content of the user request, the remote server may determine whether a matching product is present in the product appearance timeline at or near the timestamp at which the video content was being presented when the request was received. The remote server may determine that a product corresponding to the user request is available in a product catalog.

At a fourth block 178, an indication to initiate an order may be received. For example, the remote server may request confirmation from the user to place an order of the product, and the user may affirmatively respond via voice or another input (e.g., touch, etc.).

At a fifth block 180, the order may be initiated and presentation of the order confirmation may be caused. For example, the remote server may initiate the order, and order confirmation may be presented audibly or at a device. In some embodiments, order confirmation may be presented at a device different than that used to consume the video content, so as to avoid interruption of the content.

Example embodiments of the disclosure provide a number of technical features or technical effects. For example, in accordance with example embodiments of the disclosure, certain embodiments of the disclosure may automatically analyze audio, video, and/or text components of content. Certain embodiments may recognize or identify presence of certain objects and/or presence of certain actors and may use one or more machine learning modules or algorithms. As a result of improved functionality, product appearance timelines may be generated and may be used to facilitate providing of information related to products responsive to user requests. Embodiments of the disclosure may improve computing efficiency and bandwidth by reducing a set of product identifiers that need to be searched responsive to requests from an entire product catalog to those associated with particular content and/or with a particular scene or timestamp in the video content. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
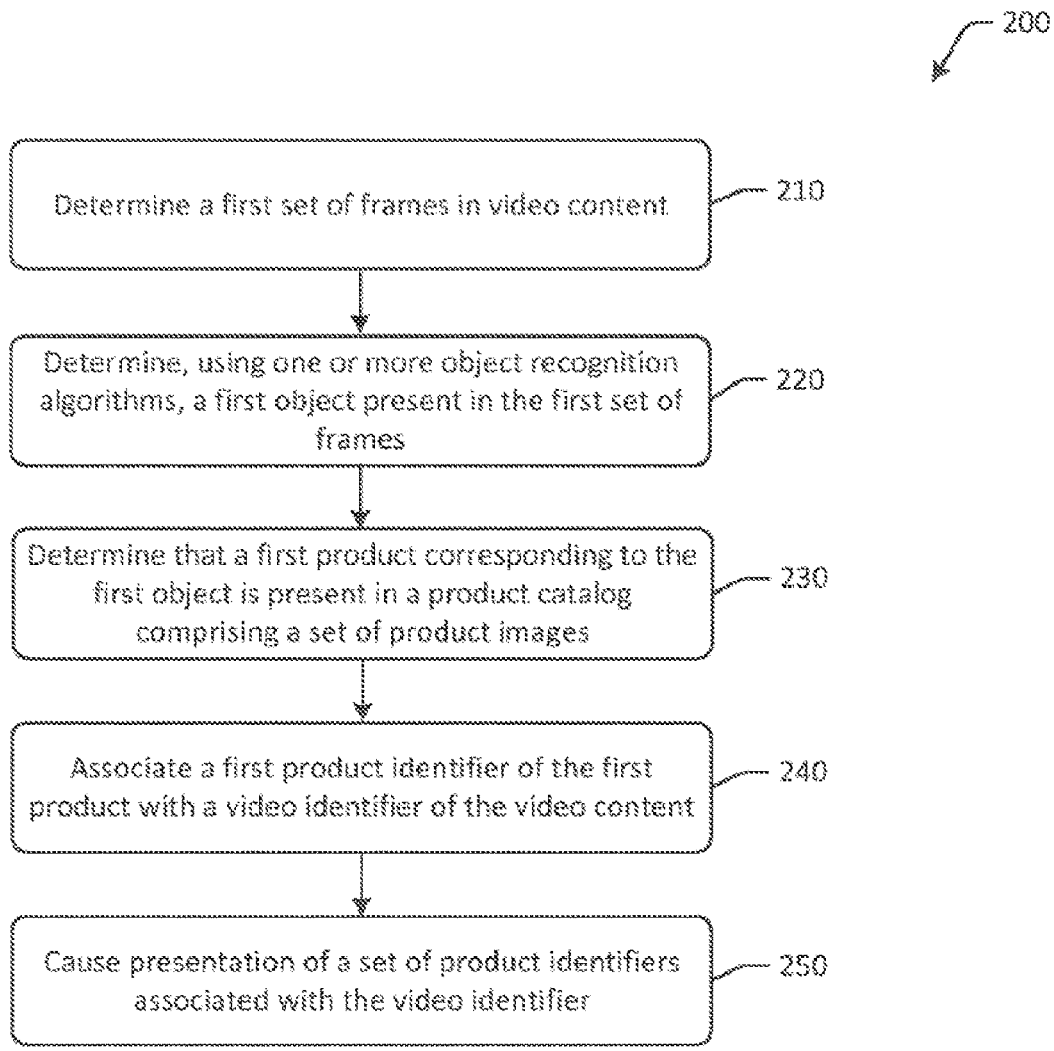
FIG. 2 is a schematic illustration of an example process flow for automated identification and mapping of objects in video content in accordance with one or more example embodiments of the disclosure.

FIG. 2 depicts an example process flow 200 for automated identification and mapping of objects in video content in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first set of frames in video content. For example, a content processing engine and/or one or more content scanning modules at a remote server may determine a first set of frames in video content. In some embodiments, frames of video content may be extracted from a video file corresponding to the video content. Frames may be extracted in sequence and may be analyzed or processed using one or more image processing algorithms.

In some instances, the remote server may determine that certain frames correspond to a certain scene in the video content. For example, the remote server may determine that the first set of frames correspond to a scene of the video content. The remote server may process the first set of frames as a cluster, or may determine objects that appear in any of the frames in the cluster as a whole. For example, the remote server may extract and/or analyze individual frames of video content to determine whether the frames are part of the same scene or a different scene. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

At block 220 of the process flow 200, computer-executable instructions stored on a memory of a device, such as a remote server or a user device, may be executed to determine, using one or more object recognition algorithms, a first object present in the first set of frames. For example, the content processing engine and/or one or more content scanning modules at a remote server may determine, using one or more object recognition algorithms, a first object present in the first set of frames. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

At block 230 of the process flow 200, computer-executable instructions stored on a memory of a device, such as a remote server or a user device, may be executed to determine that a first product corresponding to the first object is present in a product catalog comprising a set of product images. For example, the content processing engine and/or one or more content scanning modules at a remote server may determine that a first product corresponding to the first object is present in a product catalog comprising a set of product images. The remote server may send one or more images of an object detected in the video content to a search engine for comparison to images of products in a product catalog. In some embodiments, the remote server may send an image of the first object as a query to a search engine for the product catalog, and may receive the first product identifier responsive to the query. In some instances, images of a product in different views may be sent to the search engine to determine whether there is a match. In other instances, multiple angles or views of a product may be stitched together to form a composite image that is used to determine whether a matching product is present in the product catalog.

At block 240 of the process flow 200, computer-executable instructions stored on a memory of a device, such as a remote server or a user device, may be executed to associate a first product identifier of the first product with a video identifier of the video content. For example, the content processing engine and/or one or more content scanning modules at a remote server may associate a first product identifier of the first product with a video identifier of the video content. For example, metadata, such as one or more data tags, may be generated to associate the first product identifier of the first product with a video identifier of the video content. In some embodiments, the first product identifier may be associated with one or more timestamps in the video content, such as a timestamp at which the product appears or timestamps for a scene in which the product appears.

At block 250 of the process flow 200, computer-executable instructions stored on a memory of a device, such as a remote server or a user device, may be executed to cause presentation of a set of product identifiers associated with the video identifier. For example, the content processing engine and/or one or more content scanning modules at a remote server may cause presentation of a set of product identifiers associated with the video identifier. The set of product identifiers may include one or more of the product identifiers that appears in the video content as a whole, or that appears in a particular scene or segment of video content. In some embodiments, if there is only one matching product to a request or query, the associated product identifier may be presented, or may be presumed to be the desired product. In some embodiments, the set of product identifiers may be automatically presented after completion of the video content.

Figure 3:
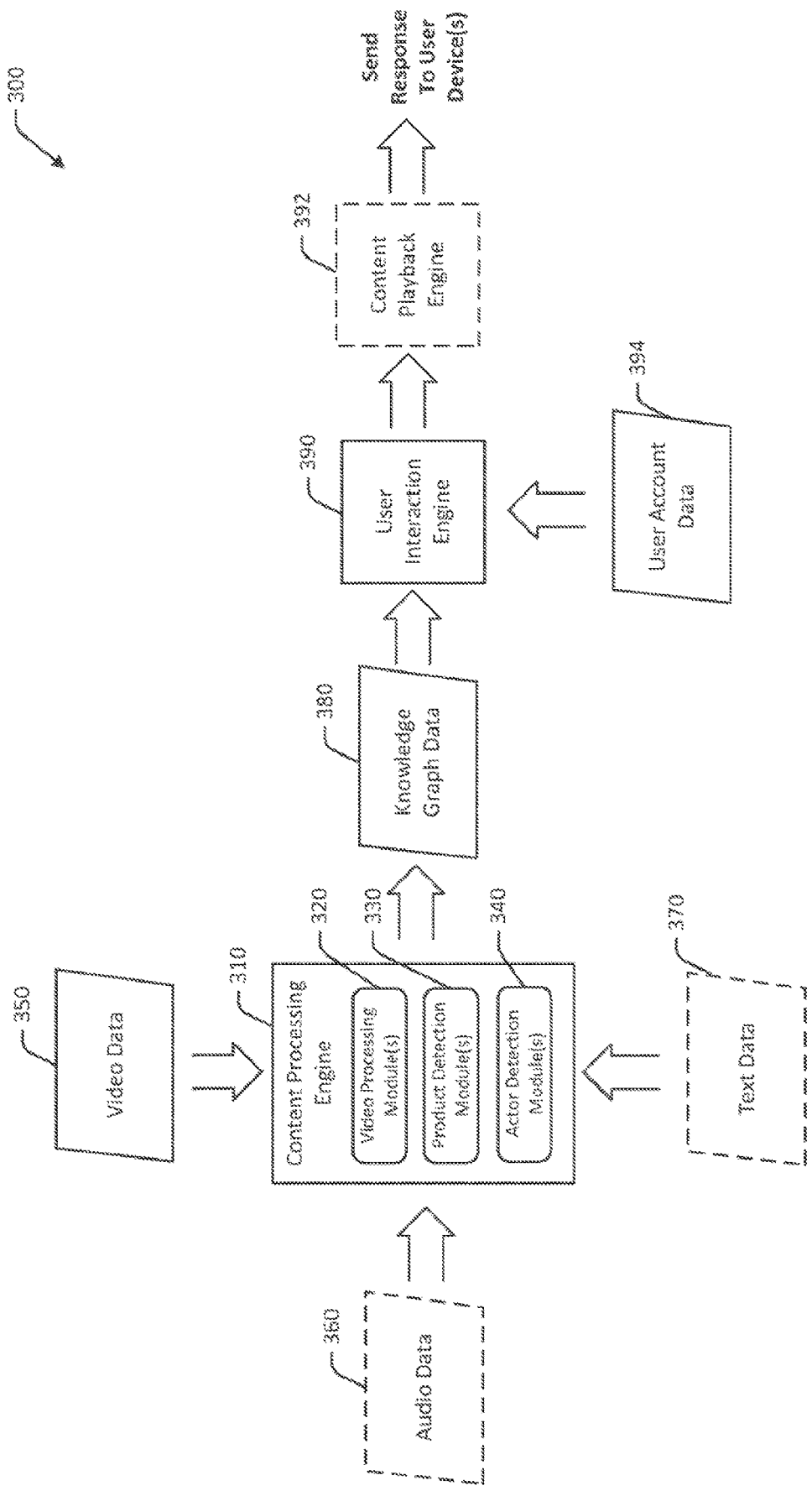
FIG. 3 is a schematic illustration of an example data flow for automated identification and mapping of objects in video content in accordance with one or more example embodiments of the disclosure.

FIG. 3 is a schematic illustration of an example data flow 300 for automated identification and mapping of objects in video content in accordance with one or more example embodiments of the disclosure. Different embodiments may include different, additional, or fewer inputs or outputs than those illustrated in the example of FIG. 3.

In FIG. 3, the example data flow 300 is schematically depicted. A content processing engine 310 and/or one or more content scanning module(s) may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more product detection modules 330, and/or one or more actor detection modules 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects or certain timestamps for different scenes that occur in the video content. For example, a video file for a movie may include a first frame, a second frame, and so forth. The video processing module(s) 320 may be configured to detect or analyze frames in video content to determine which frames correspond to the same scene. For example, the video processing module(s) 320 may include facial recognition and/or human face detection algorithms that can be used to identify people or themes in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like.

The product detection module(s) 330 may be configured to process and/or analyze frames of video content to determine whether objects identified in the frames are also found, or otherwise correspond to, products in a product catalog or other set of product data. In some instances, the product detection module(s) 330 may be configured to generate a composite image of a product using multiple views and/or images of the same product. The product detection module(s) 330 may be configured to perform an image matching process to determine whether there is a threshold match between an image of an object identified in video content and a corresponding image of a product in a product catalog. A threshold match may be represented as a predetermined probability value indicative of a likelihood that two images are of the same item.

The actor detection module(s) 340 may be configured to analyze and/or process frames to determine whether a human face is present in the frame, and if so, whether the human face corresponds to a known actor. The actor detection module(s) 340 may be configured to perform an image-to-image analysis to determine whether a threshold match is present. The actor detection module(s) 340 may determine a character name of a character in the video content, the name of the actor portraying the character, and/or other data that may be used by a user to identify an object. In some embodiments, the content processing engine 310 may be configured to determine relationships between the detected actors and/or characters and the detected products.

The content processing engine 310 may receive one or more inputs that may be used to generate one or more outputs, such as knowledge graph data 380. For example, the content processing engine 310 may receive one or more of video data 350 associated with the video content, optional audio data 360 that may be associated with the video content and used to identify products and/or actors, and/or optional text data 370 that may be associated with the video content and used to identify products and/or actors. In some embodiments, the video data 350, audio data 360, and/or text data 370 may be extracted from a content file.

The content processing engine 310 may process the respective data associated with the content for identification of products and/or actors present in the video content. For example, the video data 350 may be processed using one or more of the video processing module(s) 320, the product detection module(s) 330, and/or the text processing module(s) 340. Likewise, the audio data 360 and/or the text data 370 may be processed using one or more of the modules or algorithms of the content processing engine 310.

Using one or more algorithms or modules, the content processing engine 310 may output knowledge graph data 380. The knowledge graph data 380 may indicate the respective objects detected in the video content, as well as actors detected in the video content, and in some instances, a relationship between the actor and the object, such as "Actor 1 drove Car A to Location B." Timestamps may be included representing a point in the video content at which the object and/or actor appear. For example, scenes may be identified using timestamps (e.g., start and end timestamps (of which there may be multiple sets, since segments may not be consecutive), etc.), location identifiers, actor identifiers, and/or other identifiers.

The knowledge graph data 380 may be input at a user interaction engine 390 and/or one or more user interaction module(s). The user interaction engine 390 may be configured to determine, responsive to a user request, one or more product identifiers using the knowledge graph data 380. For example, the user interaction engine 390 may receive a request to determine a product identifier associated with a particular video content identifier and/or actor identifier. The user interaction engine 390 may determine the product identifier using one or more knowledge graph data 380. In some embodiments, the user interaction engine 390 may receive user account data 394 that may be used to determine, for example, whether a user is currently consuming video content using a device associated with the user account, and if so, a video content identifier of the video content. The user interaction engine 390 may optionally output an identified product responsive to the request to a content playback engine 392 that may be used to coordinate interaction with the user so as to not interrupt playback of the video content. For example, the content playback engine 392 may coordinate presentation of a response to the user request via a speaker device that is not currently being used to present the video content. The response may therefore be sent to one or more user devices associated with the user account.

Figure 4:
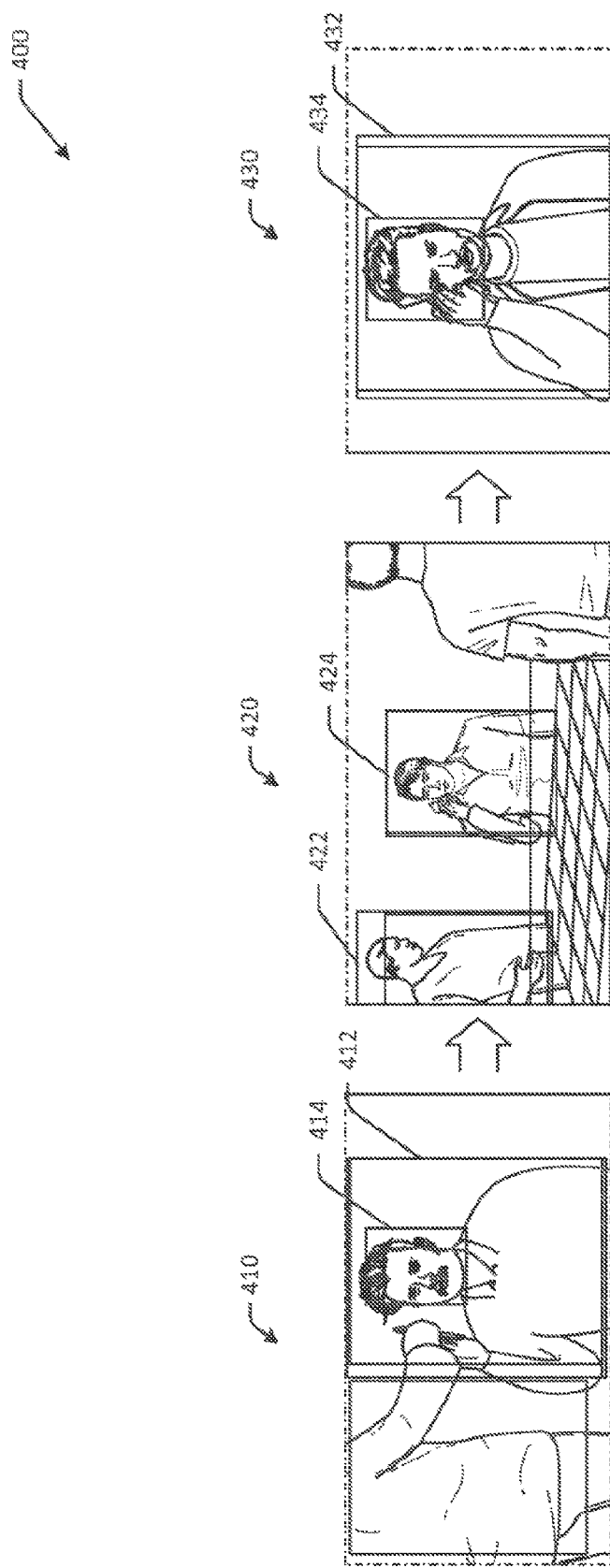
FIG. 4 is a schematic illustration of example object identification in digital content and scene detection in accordance with one or more example embodiments of the disclosure.

FIG. 4 is a schematic illustration of example object identification in digital content and scene detection 400 in accordance with one or more example embodiments of the disclosure. In FIG. 4, at a first frame 410, human detection algorithm(s) may be used to identify a human 412 present in the first frame 410, and facial recognition algorithm(s) may be used to identify the face 414 of the human in the first frame 410. In some embodiments, subtitle and/or metadata associated with the video content may be used to determine a character name and/or an actor name. For facial recognition, a remote server may determine, using one or more facial recognition algorithms, a first actor present in the first set of frames, determine a relationship between the first object and the first actor; and generate a knowledge graph for the video content, the knowledge graph representing the relationship between the first actor and the first object. For example, "Actor 1 wearing Shirt X."

At a second frame 420, human detection algorithm(s) may be used to identify a first human 422 and a second human 424 present in the second frame 420, and facial recognition algorithm(s) may be used to identify the human faces.

At a third frame 430, human detection algorithm(s) may be used to identify a human 432 present in the third frame 430, and facial recognition algorithm(s) may be used to identify the face 434 of the human in the third frame 430. In some embodiments, subtitle and/or metadata associated with the video content may be used to determine a character name and/or an actor name.

Timestamps may be determined for segments and/or events that occur in the content. For example, a first timestamp may be associated with a start of the first event, and a second timestamp may be associated with an end of the first event. Timestamps may be used to generate video summaries. For example, a video summary may include segments or portions of segments as identified using respective start and end timestamps.

To identify segments, the remote server may extract video, audio, and/or text files from a content file. For example, the remote server may extract a first set of video frames that correspond to the content and/or a segment of the content (if the segment has been identified). The extracted video frames may be processed. In some instances, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, or other audio, text, image, or video processing algorithms. In some embodiments, individual frames or sets of frames, or portions of text data or audio data, may be analyzed to determine whether any predefined objects are present.

In some embodiments, frames may be extracted from a video file for video content. Objects and faces in the frame may be detected. Image-embedding vectors for the detected objects and faces may be generated. For vector generation, a remote server may generate, using one or more neural networks, a first image-embedding vector for the first object, and generate, using the one or more neural networks, a second image-embedding vector for the first actor, where the first image-embedding vector and the second image-embedding vector are used to identify the respective first product and the first actor in one or more knowledge bases. One or more neural networks may be used to generate a signature for the objects and faces in 4096 dimensions. Image matching algorithms may be used to match the detected objects with a knowledge base and/or product catalog. The knowledge base may include the image signatures for the catalog images against which the frames may be matched. On a successful match, visual context information may be generated and stored in association with the video content identifier.

The output of the frame or the set of frames may be used to generate metadata for the segment from which the frames were extracted and/or the segment the frames are otherwise associated with.

Figure 5:
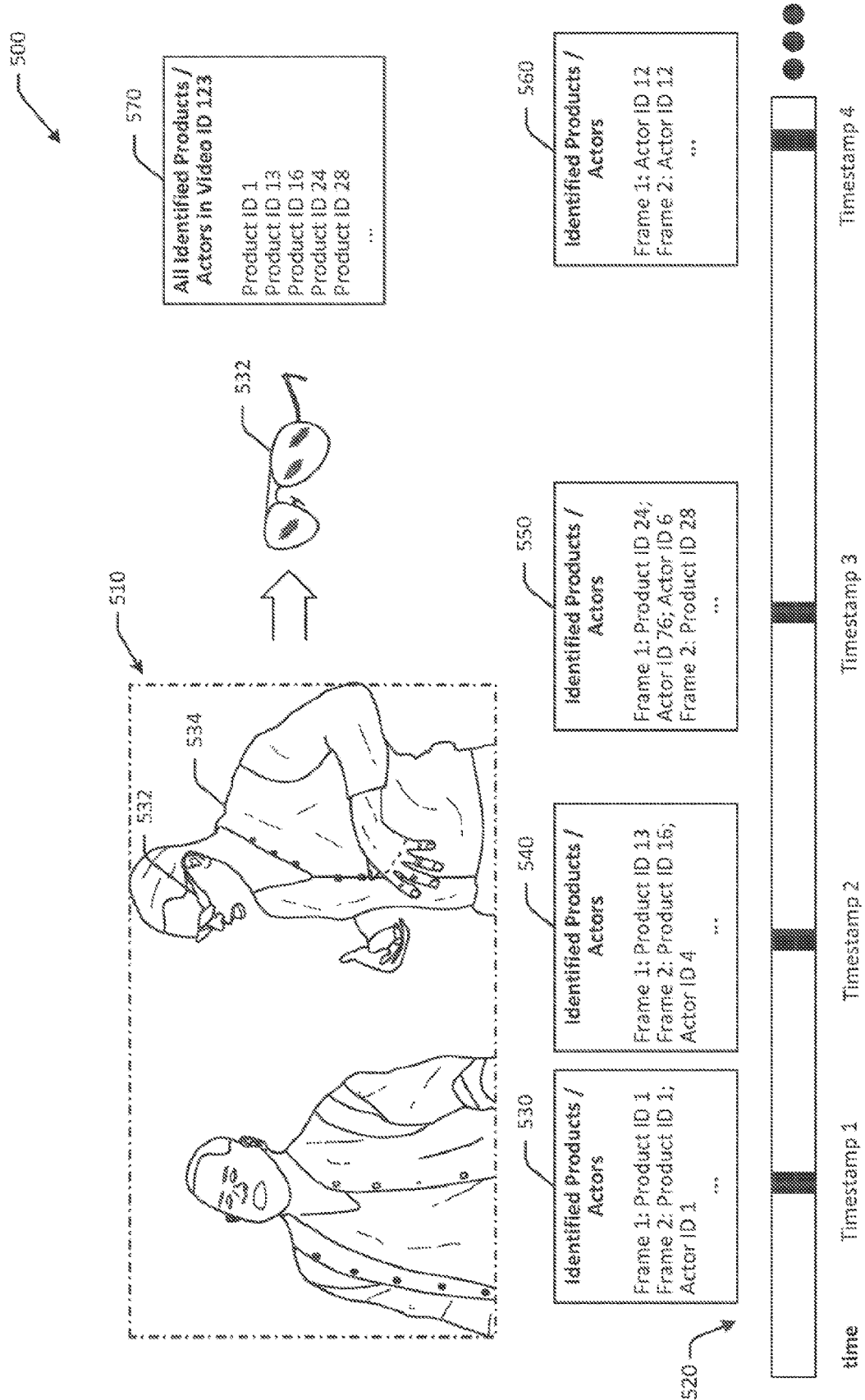
FIG. 5 is a schematic illustration of example object identification and associated product appearance timeline in accordance with one or more example embodiments of the disclosure.

FIG. 5 is a schematic illustration of example object identification and associated product appearance timeline 500 in accordance with one or more example embodiments of the disclosure. While example embodiments of the disclosure may be described in the context of frames or images, it should be appreciated that the disclosure is more broadly applicable to any suitable portion of digital content.

In FIG. 5, a user may have consumed video content at an earlier point in time, and may then recall that the user was interested in a pair of sunglasses that appear in the content. For example, the user may have consumed video content 510, and may have desired sunglasses that an actor wore in the video content 510. The user may therefore may a request for information regarding "sunglasses in Video Content 510." One or more computer systems, such as a remote server, may determine a set of product identifiers 570 of the products and/or actors that occur in the video content 510. The remote server may determine that Actor 534 wears sunglasses 532 in the video content 510. The sunglasses 532 may have a product identifier of Product ID 16. The remote server may therefore determine that the user may be interested in the sunglasses 532, and may offer the user the opportunity to purchase the sunglasses 532, or to view additional information.

In some embodiments, the remote server may determine a timeline 520 for the video content and the products and/or actors that appear in the video content. Such timelines may be product appearance timelines, and may helpful in determining a product that a user may be interested in when a user is consuming the video content in real time. For example, based on a point in the video content at which the user is viewing, the remote server may be more reliably able to determine a specific product of interest using the additional data of the point at which the user is watching when the request was made. For example, the remote server may determine that the product of interest occurred within a threshold length of time, such as within the previous 5 minutes of the video content. The remote server may use the product appearance timeline to determine or identify the product of interest. For example, the timeline 520 may indicate at a first timestamp 530, a first set of products and/or actors appears, at a second timestamp 540, a second set of products and/or actors appears, at a third timestamp 550, a third set of products and/or actors appears, at a fourth timestamp 560, a fourth set of products and/or actors appear, and so forth. To generate the timeline 520, the remote server may determine a timestamp associated with at least one frame in the set of frames, associate the timestamp with the first object, and generate a timeline for the video content comprising the first product identifier at the timestamp.

Figure 6:
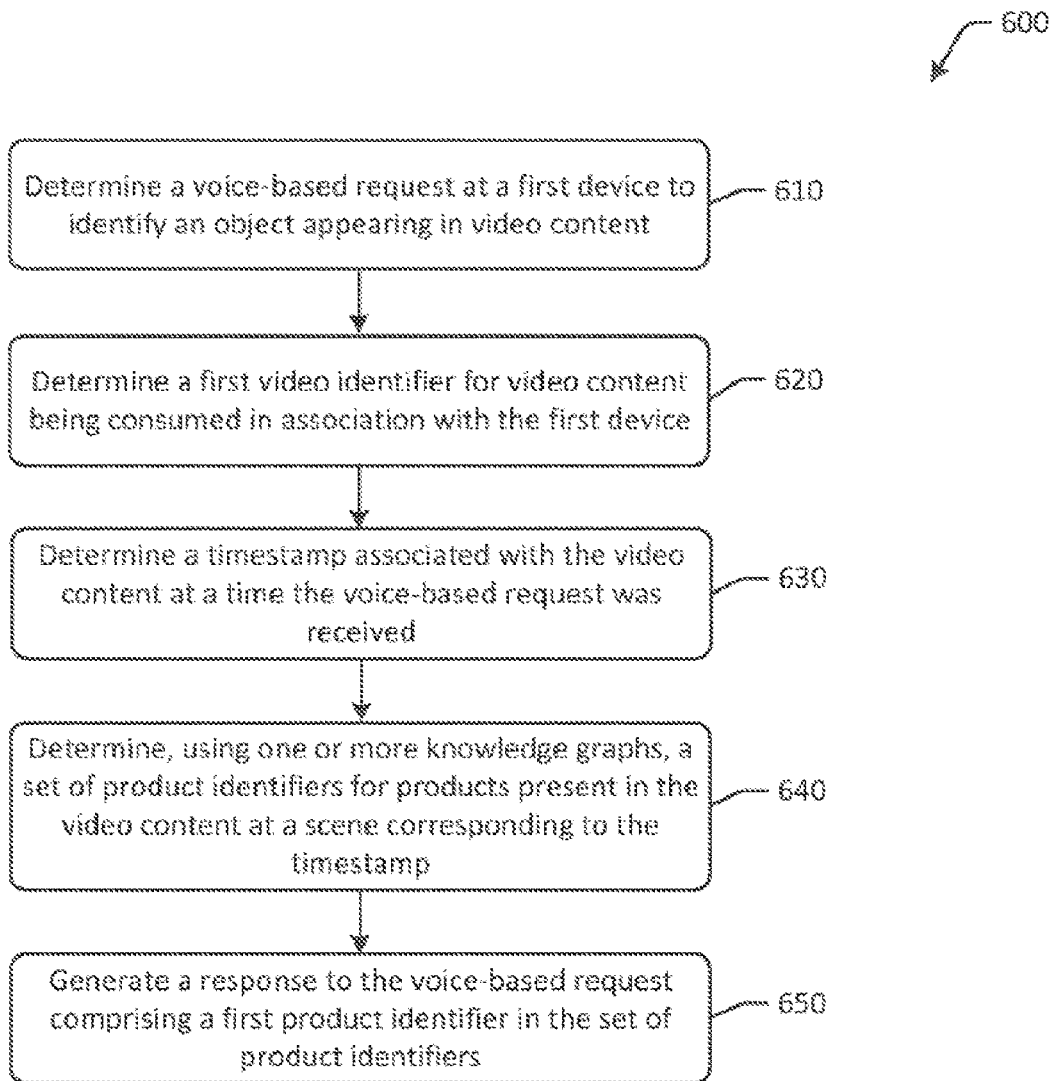
FIG. 6 is a schematic illustration of an example process flow for semantic video segmentation to identify objects appearing in video content in accordance with one or more example embodiments of the disclosure.

FIG. 6 depicts an example process flow 600 for semantic video segmentation to identify objects appearing in video content in accordance with one or more example embodiments of the disclosure. While example embodiments of the disclosure may be described in the context of movies or other video content, it should be appreciated that the disclosure is more broadly applicable to any type of digital content. Some or all of the blocks of the process flows in this disclosure may be performed in a distributed manner across any number of devices. The operations of the process flow 600 may be optional and may be performed in a different order.

At block 610 of the process flow 600, computer-executable instructions stored on a memory of a device, such as a remote server or a user device, may be executed to determine a voice-based request at a first device to identify an object appearing in video content. For example, a voice interaction engine and/or one or more voice interaction modules at a remote server may determine a voice-based request at a first device to identify an object appearing in video content. The voice-based request may be a user utterance at a speaker device or a user utterance at a different device, and, in some embodiments, may be a text-based request. The voice-based request may be to identify an object appearing in content, such as a particular object in a movie, and may or may not be associated with a character name, an actor name, or other contextual data.

At block 620 of the process flow 600, computer-executable instructions stored on a memory of a device, such as a remote server or a user device, may be executed to determine a first video identifier for video content being consumed in association with the first device. For example, the voice interaction engine and/or one or more voice interaction modules at a remote server may determine a first video identifier for video content being consumed in association with the first device. The remote server may determine a user account identifier associated with the first device, and may determine whether the first device is being used to consume video content. If not, the remote server may determine whether any other devices associated with the user account identifier are being used to consume video content. In either case, the remote server may determine a first video identifier for video content being consumed in association with the first device.

At block 630 of the process flow 600, computer-executable instructions stored on a memory of a device, such as a remote server or a user device, may be executed to determine a timestamp associated with the video content at a time the voice-based request was received. For example, the voice interaction engine and/or one or more voice interaction modules at a remote server may determine a timestamp associated with the video content at a time the voice-based request was received. The timestamp may be a timestamp associated with the video content representing a point in the video content at which the user was watching and made the request. In some embodiments, a scene corresponding to the timestamp may be determined.

At block 640 of the process flow 600, computer-executable instructions stored on a memory of a device, such as a remote server or a user device, may be executed to determine, using one or more knowledge graphs, a set of product identifiers for products present in the video content at a scene corresponding to the timestamp. For example, the content processing engine and/or one or more content scanning modules at a remote server may determine, using one or more knowledge graphs, a set of product identifiers for products present in the video content at a scene corresponding to the timestamp. For example, in some instances, the remote server may determine a product appearance timeline associated with the first video identifier. The remote server may determine the product identifiers associated with the video content at the timestamp, and may determine a relationship between objects and actors using one or more knowledge graphs.

At block 650 of the process flow 600, computer-executable instructions stored on a memory of a device, such as a remote server or a user device, may be executed to generate a response to the voice-based request comprising a first product identifier in the set of product identifiers. For example, the voice interaction engine and/or one or more voice interaction modules at a remote server may generate a response to the voice-based request comprising a first product identifier in the set of product identifiers. The response may include one or both an audible response and a visual response, and may include product information, order confirmation, follow up queries (e.g., what size, what color, etc.), and the like. The response may include product identification information. In some embodiments, the response may include an audio-based response and visual confirmation of a purchase transaction. The remote server may generate an audible query with one or more search results for presentation via the first device. Playback of the video content may be maintained while the set of product identifiers is determined and/or presented.

Figure 7:
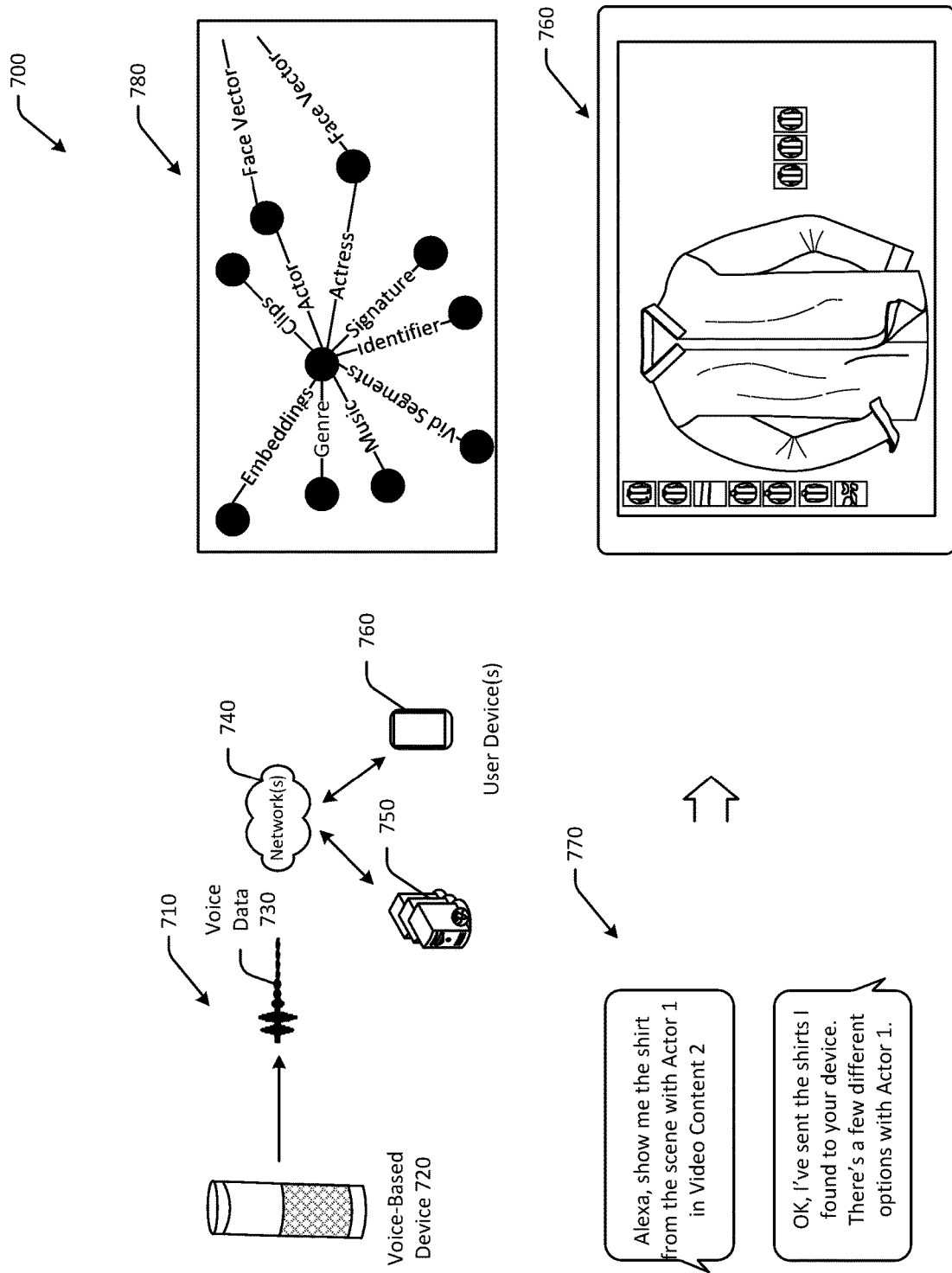
FIG. 7 is a schematic illustration of an example use case for semantic video segmentation to identify objects appearing in video content in accordance with one or more example embodiments of the disclosure.

FIG. 7 is a schematic illustration of an example use case 700 for semantic video segmentation to identify objects appearing in video content in accordance with one or more example embodiments of the disclosure. The illustration of FIG. 7 is solely provided for illustrative purposes. Other embodiments may have different, additional, or fewer components.

FIG. 7 illustrates a system that may be used to generate a response to a voice-based user query for information related to a product. For example, an environment 710 may include a voice interaction device 720 that a user can interact with. The voice interaction device 720 may communicate with one or more voice processing servers 750 and/or one or more user devices 760 via one or more communication networks 740. The voice interaction device 720 may determine a meaning of utterances spoken by the user, and may generate audible content, such as comments, inquiries, and other responses, in response to user utterances. The user may interact with the voice interaction device 720, for example via a voice assistant or other audible or sound-based interaction technique. In some embodiments, the user may interact with the voice interaction device 720 by providing analog sound input (e.g., voice) to the voice interaction device 720. The voice interaction device 720 may receive or detect the analog sound input and may generate digital voice data 730 representative of the analog sound input. The voice interaction device 720 may send the voice data 730 to the one or more voice processing server(s) 750 over the one or more wired or wireless communication networks 740 to determine a meaning of the sound input, or voice data 730. In some embodiments, the voice interaction device 720 may perform voice processing on the voice data 730 locally.

The voice interaction device 720 may be configured to generate the audible content and may be, for example, a device such as a television, a laptop computer, a tablet, a computer monitor, a speaker-type device, augmented reality or virtual reality glasses or devices, or another device configured to output audio. The voice interaction device 720 may include or may utilize a speech interface device or other audio device, such as one or more speakers, that are capable of playing or presenting various types of audio. The voice interaction device 720 may include one or more microphones to detect ambient sound. The voice interaction device 720 may be located within the environment 710, such as a home to provide services for the user. The voice interaction device 720 may operate in conjunction with and/or under the control of a remote network-based speech command service (e.g., voice processing server(s) 750, etc.) that is configured to receive audio, to recognize speech in the audio, and to perform functions or services in response to the recognized speech, or to generate audible dialog or audible content in response to recognized speech. The voice interaction device 720 may have one or more microphones and one or more audio speakers or transducers to facilitate speech interactions with the user. The voice interaction device 720 may have a network communications interface for communicating over one or more communications networks 740. The voice interaction device 720 may receive spoken expressions or utterances from the user and may provide services, perform actions, or facilitate conversation or dialogue in response to the spoken utterances. For example, the user may speak an utterance with a verbal request. In some embodiments, the voice interaction device 720 may only be activated to listen upon determining that the user has spoken a predefined wake or trigger expression (e.g., "Awake" or "Alexa," etc.), which may be followed by an utterance (e.g., "I'd like to go to a movie."). Provided services may include performing actions or activities, rendering media, obtaining and/or providing information, providing information via generated or synthesized speech via the voice interaction device 720, initiating Internet-based services on behalf of the user, performing actions relating to home automation and control, and so forth.

In the example of FIG. 1, the user may initiate a conversation 770 with the voice interaction device 720 by speaking "Alexa, show me the shirt from the scene with Actor 1 in Video Content 2." This request may be made while a device associated with the user account is not being used to playback Video Content 2. The system may determine the desired product, and may present an audible response of "OK, I've sent the shirts I found to your device. There's a few different options with Actor 1." In this example, there may be more than one valid search result, and the valid search results may be provided to the user, for example at a visual user interface 760 at a device for the user to view and determine whether any of the products are of interest for purchase.

The voice processing server(s) 750 may receive a query (which may be text-based instead of the voice-based query illustrated in FIG. 7) that includes a request for an object that is present in video content. The voice processing server(s) 750 may determine that the object is a first object, and may determine a set of search results that includes the first product identifier. In some instances, the set of search results may include a plurality of search results, such as the multiple shirts example of FIG. 7, and the voice processing server(s) 750 may determine a subset of the search results for presentation, where the subset of the search results includes different types of the object. In some embodiments, the voice processing server(s) 750 may determine that the first product identifier is associated with the actor identifier in the one or more knowledge graphs, and/or may determine that the first product identifier corresponds to a product present in a product catalog, and/or may determine that the first product identifier is not desired, such as if the user declines a purchase.

FIG. 7 depicts an example knowledge graph 780 that may be used to identify relationships between objects and actors. Knowledge graph 780 may include knowledge graph data, such as semantic knowledge, metadata, people, content, auto generated content, information, and so forth. In the example of FIG. 7, relationships between content genres, music, video segments, embedded content, identifiers, signatures, actresses, actors, clips, facial vectors, and so forth are illustrated. Such data may be used to determine actions, events, character names, locations, and/or other features that occur in video content.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 8:
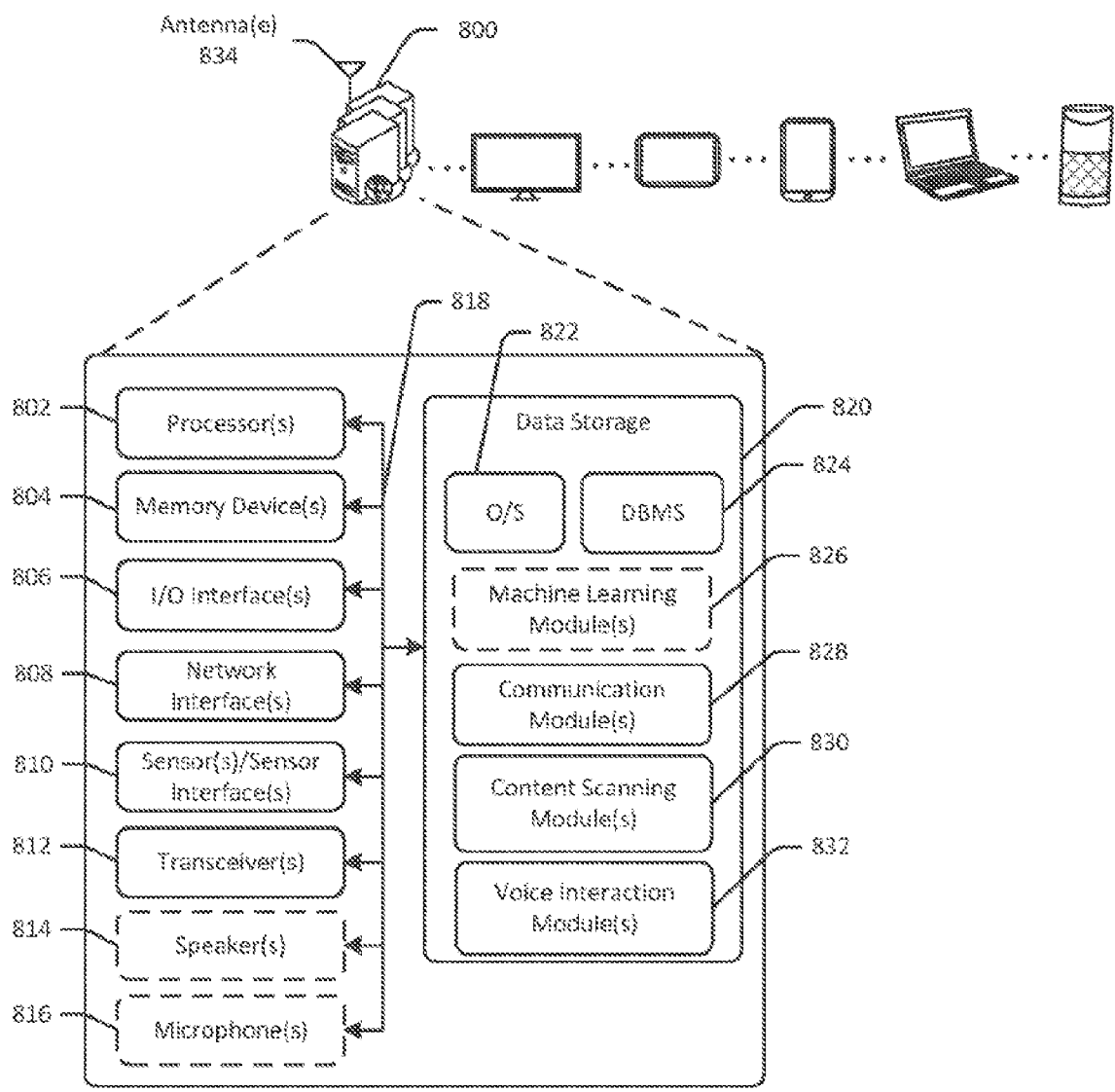
FIG. 8 is a schematic block diagram of an illustrative device in accordance with one or more example embodiments of the disclosure.

FIG. 8 is a schematic block diagram of an illustrative remote server 800 in accordance with one or more example embodiments of the disclosure. The remote server 800 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 800 may correspond to an illustrative device configuration for the devices of FIGS. 1-7.

The remote server 800 may be configured to communicate via one or more networks with one or more servers, search engines, user devices, or the like. In some embodiments, a single remote server or single group of remote servers may be configured to perform more than one type of item detection, actor detection, and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 800 may include one or more processors (processor(s)) 802, one or more memory devices 804 (generically referred to herein as memory 804), one or more input/output (I/O) interface(s) 806, one or more network interface(s) 808, one or more sensors or sensor interface(s) 810, one or more transceivers 812, one or more optional speakers 814, one or more optional microphones 816, and data storage 820. The remote server 800 may further include one or more buses 818 that functionally couple various components of the remote server 800. The remote server 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the remote server 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 804 of the remote server 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to memory 804 for use by the processor(s) 802 during the execution of the computer-executable instructions. Moreover, output data generated as a result of execution of the computer-executable instructions by the processor(s) 802 may be stored initially in memory 804, and may ultimately be copied to data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more optional machine learning module(s) 826, one or more communication module(s) 828, one or more content scanning module(s) 830, and/or one or more voice interaction module(s) 832. Some or all of these module(s) may be sub-module(s). Any of the components depicted as being stored in data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in data storage 820 may support functionality described in reference to correspondingly named components earlier in this disclosure.

The data storage 820 may further store various types of data utilized by components of the remote server 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, the datastore(s) may include, for example, user preference information, user action information, user profile information, historical content consumption information, and other information.

The processor(s) 802 may be configured to access the memory 804 and execute computer-executable instructions loaded therein. For example, the processor(s) 802 may be configured to execute computer-executable instructions of the various program module(s), applications, engines, or the like of the remote server 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the optional machine learning module(s) 826 may include computer-executable instructions, code, or the like that responsive to execution by one or more of the processor(s) 802 may perform functions including, but not limited to, determining objects or items present in video content, determining matches between object in video content and product catalogs, determining matches between user requests and objects in video content, generating one or more machine learning models or algorithms, determining frames of content, and the like.

The communication module(s) 828 may include computer-executable instructions, code, or the like that responsive to execution by one or more of the processor(s) 802 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content scanning module(s) 830 may include computer-executable instructions, code, or the like that responsive to execution by one or more of the processor(s) 802 may perform functions including, but not limited to, analyzing digital content, extracting frames, determining pixel color values, determining audio content, determining or analyzing text and/or audio files, identifying certain portions of content, extracting segments of content, determining objects that appear in video content, determining actors that appear in video content, generating knowledge graphs, and the like.

The voice interaction module(s) 832 may include computer-executable instructions, code, or the like that responsive to execution by one or more of the processor(s) 802 may perform functions including, but not limited to, determining user requests, determining actively presented content, determined content that is being played back, determining user account information, determining device identifiers, and the like.

Referring now to other illustrative components depicted as being stored in the data storage 820, the O/S 822 may be loaded from the data storage 820 into the memory 804 and may provide an interface between other application software executing on the remote server 800 and hardware resources of the remote server 800. More specifically, the O/S 822 may include a set of computer-executable instructions for managing hardware resources of the remote server 800 and for providing common services to other application programs (e.g., managing memory allocation among various application programs). In certain example embodiments, the O/S 822 may control execution of the other program module(s) to for content rendering. The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 800 is a mobile device, the DBMS 824 may be any suitable light-weight DBMS optimized for performance on a mobile device.

Referring now to other illustrative components of the remote server 800, the input/output (I/O) interface(s) 806 may facilitate the receipt of input information by the remote server 800 from one or more I/O devices as well as the output of information from the remote server 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 800 may further include one or more network interface(s) 808 via which the remote server 800 may communicate with any of a variety of other systems, platforms, networks, devices, and so forth. The network interface(s) 808 may enable communication, for example, with one or more wireless routers, one or more host servers, one or more web servers, and the like via one or more of networks.

The antenna(e) 834 may include any suitable type of antenna depending, for example, on the communications protocols used to transmit or receive signals via the antenna (e) 834. Non-limiting examples of suitable antennas may include directional antennas, non-directional antennas, dipole antennas, folded dipole antennas, patch antennas, multiple-input multiple-output (MIMO) antennas, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the remote server 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the remote server 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 814 may be any device configured to generate audible sound. The optional microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the remote server 800 may include alternate and/or additional hardware, software, or firmware components beyond those described or depicted without departing from the scope of the disclosure. More particularly, it should be appreciated that software, firmware, or hardware components depicted as forming part of the remote server 800 are merely illustrative and that some components may not be present or additional components may be provided in various embodiments. While various illustrative program module(s) have been depicted and described as software module(s) stored in data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining, by one or more computer processors coupled to memory, a query comprising a request corresponding to an object that is present in video content, the video content presented on a first device;
   determining the query corresponds to a video identifier and a first timestamp;
   determining the query is associated with a first product based on a product catalog, the product catalog associating the video identifier and the first timestamp with the first product;
   determining product information corresponding to the object; and
   causing the first device to present the product information.

2. The method of claim 1, further comprising causing the first device to present a representation of the first product, wherein product information includes one or more of product identification information, size, or color.

3. The method of claim 1, further comprising:
   determining the query corresponds to a user account identifier;
   determining a second device associated with the user account identifier; and
   causing the second device to present the product information.

4. The method of claim 1, further comprising:
   determining instructions to order the first product;
   initiating an order of the first product; and
   causing the first device to present an order confirmation message.

5. The method of claim 1, further comprising:
   generating, using one or more neural networks, a first image-embedding vector for the first object;
   determining, using one or more facial recognition algorithms, a first individual present in the first frame corresponding to the first timestamp;
   generating, using the one or more neural networks, a second image embedding vector for the first individual; and
   associating the first individual and the first product based on the first timestamp.

6. The method of claim 5, further comprising:
   determining a relationship between the first object and the first individual; and generating a knowledge graph for the video content, the knowledge graph representing the relationship between the first individual and the first object.

7. The method of claim 6, wherein the first image-embedding vector and the second image-embedding vector are used to identify the respective first product and the first individual in one or more knowledge graphs.

8. The method of claim 1, further comprising:
determining a first frame in video content corresponding to the first timestamp;
determining, using one or more object recognition algorithms, a first object present in the first frame;
determining that the first product corresponding to the first object and having a first product identifier is present in the product catalog comprising a set of product images; and
associating the first product identifier of the first product with the video identifier of the video content and the first timestamp.

9. The method of claim 8, further comprising generating a timeline for the video content comprising the first product identifier at the first timestamp, wherein the query is generated by the first device and the video content is paused while the first device presents the representation of the first product and the product information.

10. A system comprising:
a memory configured to store computer-executable instructions; and
at least one computer processor configured to access the memory and execute the computer-executable instructions to:
determine a query comprising a request corresponding to an object that is present in video content, the video content presented on a first device;
determine the query corresponds to a video identifier and a first timestamp;
determine the query is associated with a first product based on a product catalog, the product catalog adapted to associate the video identifier and the first timestamp with the first product;
determine product information corresponding to the object; and
cause the first device to present the product information.

11. The system of claim 10, wherein the at least one processor is further configured to access the memory and execute the computer-executable instructions to: cause the first device to present a representation of the first product, wherein product information includes one or more of product identification information, size, or color, wherein product information includes one or more of product identification information, size, or color.

12. The system of claim 10, wherein the at least one processor is further configured to access the memory and execute the computer-executable instructions to:
determine the query corresponds to a user account identifier;
determine a second device associated with the user account identifier; and
cause the second device to present the product information.

13. The system of claim 10, wherein the at least one processor is further configured to access the memory and execute the computer-executable instructions to:
determine instructions to order the first product;
initiate an order of the first product; and
cause the first device to present an order confirmation message.

14. The system of claim 10, wherein the at least one processor is further configured to access the memory and execute the computer-executable instructions to:
generate, using one or more neural networks, a first image-embedding vector for the first object;
determine, using one or more facial recognition algorithms, a first individual present in the first frame corresponding to the first timestamp;
generate, using the one or more neural networks, a second image embedding vector for the first individual; and
associate the first individual and the first product based on the first timestamp.

15. The system of claim 14, wherein the at least one processor is further configured to access the memory and execute the computer-executable instructions to:
determine a relationship between the first object and the first individual; and
generate a knowledge graph for the video content, the knowledge graph representing the relationship between the first individual and the first object.

16. The system of claim 15, wherein the at least one processor is further configured to access the memory and execute the computer-executable instructions to generate a timeline for the video content comprising a first product identifier at the first timestamp, wherein the first image-embedding vector and the second image-embedding vector are used to identify the respective first product and the first individual in one or more knowledge graphs.

17. The system of claim 10, wherein the at least one processor is further configured to access the memory and execute the computer-executable instructions to:
determine a first frame in video content corresponding to the first timestamp;
determine, using one or more object recognition algorithms, a first object present in the first frame;
determine that the first product corresponding to the first object and having a first product identifier is present in the product catalog comprising a set of product images; and
associate the first product identifier of the first product with the video identifier of the video content and the first timestamp.

18. A non-transitory computer-readable memory medium configured to store instructions thereon that, when loaded by a processor, cause the processor to:
determine a query comprising a request corresponding to an object that is present in video content, the video content presented on a first device;
determine the query corresponds to a video identifier and a first timestamp;
determine the query is associated with a first product based on a product catalog, the product catalog associating the video identifier and the first timestamp with the first product;
determine product information corresponding to the object; and
cause the first device to present the product information.

19. The non-transitory computer-readable memory medium of claim 18, further configured to cause the processor to: cause the first device to present a representation of the first product, wherein product information includes one or more of product identification information, size, or color.

20. The non-transitory computer-readable memory medium of claim 18, further configured to cause the processor to:

determine instructions to order the first product;
initiate an order of the first product; and
cause the first device to present an order confirmation message.

* * * * *